(12) United States Patent
Shimoyama

(10) Patent No.: US 8,264,197 B2
(45) Date of Patent: Sep. 11, 2012

(54) PRIMARY COIL RAISING TYPE NON-CONTACT CHARGING SYSTEM WITH ELEVATING-TYPE PRIMARY COIL

(75) Inventor: Yoshiro Shimoyama, Chiba (JP)

(73) Assignees: Hyundai Motor Japan R&D Center, Inc., Yokohama (JP); Hyundai Motor Company, Seoul (KR)

( * ) Notice: Subject to any disclaimer, the term of this patent is extended or adjusted under 35 U.S.C. 154(b) by 299 days.

(21) Appl. No.: 12/824,841

(22) Filed: Jun. 28, 2010

(65) Prior Publication Data
US 2011/0133692 A1    Jun. 9, 2011

(30) Foreign Application Priority Data

Dec. 3, 2009    (JP) ................................ 2009-275534

(51) Int. Cl.
*H01M 10/46* (2006.01)

(52) U.S. Cl. ........................................ 320/108; 320/109

(58) Field of Classification Search .................. 320/104, 320/107, 108, 109, 114, 115; 180/65.1, 65.21; 414/227, 230, 254
See application file for complete search history.

(56) References Cited

U.S. PATENT DOCUMENTS 5,821,731 A * 10/1998 Kuki et al. .................... 320/108
5,850,135 A * 12/1998 Kuki et al. .................... 320/108
6,421,600 B1    7/2002 Ross
2010/0225271 A1 *  9/2010 Oyobe et al. .................. 320/108

FOREIGN PATENT DOCUMENTS

| JP | 5-111168 A | 4/1993 |
| JP | 7-039007 A | 2/1995 |
| JP | 7-227007 A | 8/1995 |
| JP | 09-213378 | 8/1997 |
| JP | 9-215211 A | 8/1997 |
| JP | 10-028332 A | 1/1998 |
| JP | 2001-177916 A | 6/2001 |
| JP | 2008-054424 A | 3/2008 |

* cited by examiner

*Primary Examiner* — Edward Tso
(74) *Attorney, Agent, or Firm* — Edwards Wildman Palmer LLP; Peter F. Corless

(57) ABSTRACT

The present invention provides a non-contact charging system with an elevating-type primary coil, which is convenient to align the position of a primary coil and a second coil and is energy-saving.

In preferred embodiment, the non-contact charging system with an elevating-type primary coil of the present invention includes: a primary coil elevated from the ground surface to face a secondary coil of a vehicle; a concave portion in which a vehicle tire is put; a pressure plate installed on the concave portion and pushed to a predetermined depth by a vehicle load from the tire; and a hydraulic cylinder elevating the primary coil when the pressure plate is pushed down.

8 Claims, 7 Drawing Sheets

PRIMARY COIL RAISING TYPE NON-CONTACT CHARGING SYSTEM WITH ELEVATING-TYPE PRIMARY COIL

CROSS-REFERENCE TO RELATED APPLICATION

The present application claims priority of Japanese Patent Application No. 2009-275534 filed Dec. 3, 2009, the entire contents of which application is incorporated herein for all purposes by this reference.

BACKGROUND (a) Technical Field

The present disclosure relates, generally, to a non-contact charging system performing non-contact charging of a battery mounted on an electric vehicle from the outside of the vehicle. More particularly, it relates to a non-contact charging system with an elevating-type primary coil, which is convenient to align the position of the primary coil on the ground surface and a second coil at the bottom of the vehicle and is energy-saving.

(b) Background Art

Japanese Patent Publication No. 2005-269687, incorporated by reference in its entirety herein, discloses a non-contact charger, in which a primary coil connected with an external power source is electromagnetically coupled with a secondary coil connected with a power battery of a vehicle. The primary coil is located to be substantially flush with the road surface and, if the vehicle stops at a predetermined position, the primary coil is driven by a motor and projects toward the bottom of the vehicle. Then, the primary coil moves horizontally toward the bottom of the secondary coil installed at the bottom of the vehicle. Preferably, the primary coil has a buffer made of rubber installed at the top thereof and is driven by an elevating motor to rise upward and be in contact with the secondary coil.

Typically, the primary coil used in a large bus weighs hundreds of kilograms, for example. As a result, a drive mechanism of the primary coil for the non-contact charger becomes bigger and more complicated. Further, if the vehicle does not stop at a predetermined position, it is inconvenient to align the position of the primary coil, as well as time-consuming.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a non-contact charging system with an elevating-type primary coil, which is convenient to align the position of a primary coil and a second coil of a vehicle, and is energy-saving.

In certain preferred embodiments, the present invention provides a non-contact charging system with an elevating-type primary coil, the system preferably including a primary coil elevated from the ground surface to face a secondary coil of a vehicle; a concave portion in which a vehicle tire is suitably put; a pressure plate suitably installed on the concave portion and pushed to a predetermined depth by a vehicle load from the tire; and a hydraulic cylinder elevating the primary coil when the pressure plate is suitably pushed down.

In a preferred embodiment, the concave portion and the pressure plate may be suitably installed in two places, respectively, corresponding to the left and right tires of the vehicle, and the hydraulic cylinder may include hydraulic paths from the pressure plates in two places, which are joined together and connected to the primary coil.

In another preferred embodiment, the depth of the concave portion, in which the tire is located, may differ depending on the size of the vehicle.

In still another preferred embodiment, the concave portions for a large vehicle, a mid-size vehicle, and a small vehicle may be preferably arranged adjacent to each other in a line and the pressure plate may pass through the concave portions.

In yet another preferred embodiment, the non-contact charging system may further include a tire guide groove suitably installed on the rear of the concave portion.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
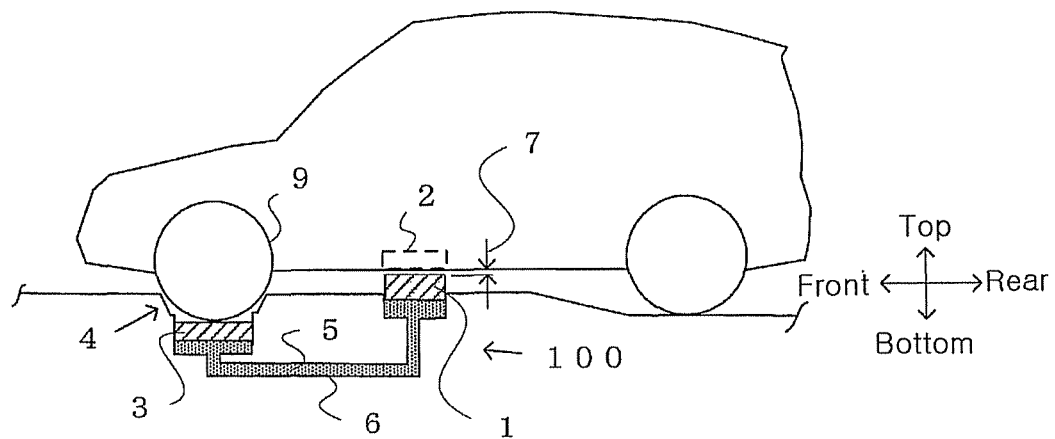
FIG. 1 is a cross-sectional view of a non-contact charging system with an elevating-type primary coil according to an exemplary embodiment of the present invention.

Reference numerals set forth in the Drawings includes reference to the following elements as further discussed below:

| | |
|---|---|
| 1: primary coil | 1a: coil unit |
| 1b: buffer | 2: secondary coil |
| 3: pressure plate | 3a: right tire pressure plate |
| 3b: left tire pressure plate | 4: concave portion |
| 5: oil | 6: hydraulic cylinder |
| 7: air gap | 7: ground surface |
| 9: tire | 9a: right tire |
| 9b: left tire | 9k: small vehicle tire |
| 9m: mid-size vehicle tire | 9g: large vehicle tire |
| 10: vehicle axis | 11: inclined surface |
| 12: vehicle bottom | 13: tire guide groove |
| 100: non-contact charging system | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In certain aspects, the present invention features a non-contact charging system with an elevating-type primary coil, the system comprising a primary coil elevated from the ground surface to face a secondary coil of a vehicle, a concave portion in which a vehicle tire is put, a pressure plate, and a hydraulic cylinder.

In one embodiment, the pressure plate is installed on the concave portion and pushed to a predetermined depth by a vehicle load from the tire.

In another embodiment, the hydraulic cylinder elevates the primary coil when the pressure plate is pushed down.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a cross-sectional view of a non-contact charging system with an elevating-type primary coil according to an exemplary embodiment of the present invention. Preferably, the non-contact charging system 100 with an elevating-type primary coil includes a primary coil 1 elevated from the ground surface to face a secondary coil of a vehicle, a concave portion 4, in which a vehicle tire 9 is put, for performing charging, a pressure plate 3 suitably installed on the concave portion 4 and pushed to a predetermined depth by a vehicle load from the tire 9, and a hydraulic cylinder 6 elevating the primary coil 1 when the pressure plate 3 is pushed down. Preferably, oil 5 is filled in the hydraulic cylinder 6.

According to certain preferred embodiments, in the non-contact charging system 100 with the elevating-type primary coil, the top of the pressure plate 3 is suitably located to be substantially flush with the ground surface. Preferably, if the front tire 9 is put into the concave portion 4, the pressure plate 3 is suitably pushed down by a vehicle load, and the primary coil 1 is elevated by the hydraulic pressure of the hydraulic cylinder 6. Accordingly, as a result, an air gap 7 between the primary coil 1 and the secondary coil 2 becomes smaller, and thus it is possible to suitably perform non-contact charging with high efficiency. Further, according to preferred embodiments of the present invention, the length from the concave portion 4 to the primary coil 1 is set to be equal to the length from the front tire 9 to the secondary coil 2. Accordingly, it is possible to control the horizontal deviation between the primary coil 1 and the secondary coil 2 within about ±3 cm.

Figure 2:
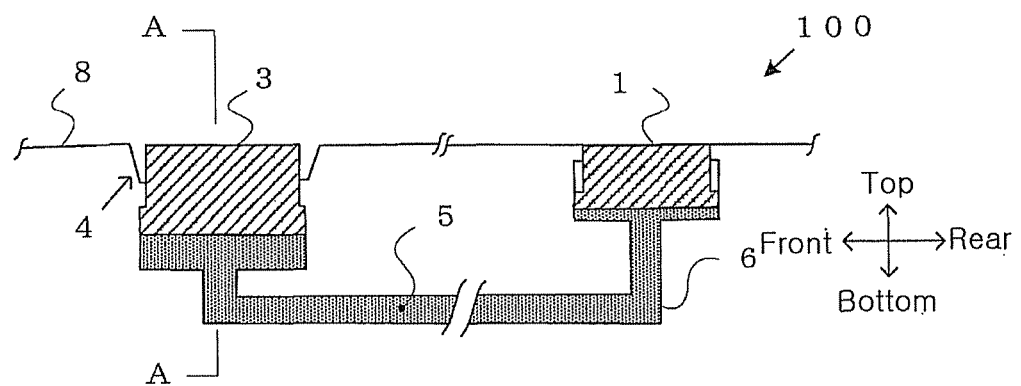
FIG. 2 is a cross-sectional view of the non-contact charging system with an elevating-type primary coil of FIG. 1, in which a vehicle load is not applied to a pressure plate.

According to further exemplary embodiments and as shown in FIG. 2 for example, FIG. 2 is a cross-sectional view of the non-contact charging system with the elevating-type primary coil in FIG. 1, in which a vehicle load is not applied to the pressure plate. In this case, for example, the vehicle load is not suitably applied to the pressure plate 3, the primary coil 1 falls to elevate the pressure plate 3. In this state, the top of the pressure plate 3 is located to be substantially flush with a ground surface 8. Further, as the primary coil 1 is a heavy structure, even when a person or a bike, which is lighter than the vehicle, steps on the pressure plate 3, the pressure plate 3 is not pushed down, and thus the primary coil 1 is not pushed up. Typically, a compact vehicle weighs approximately 700 kg, however light it is, and thus the vehicle load applied to both front tires thereof is approximately 300 kg. According to other further preferred embodiments, the hydraulic cylinder is suitably designed to elevate the primary coil 1 with the vehicle load.

Figure 3:
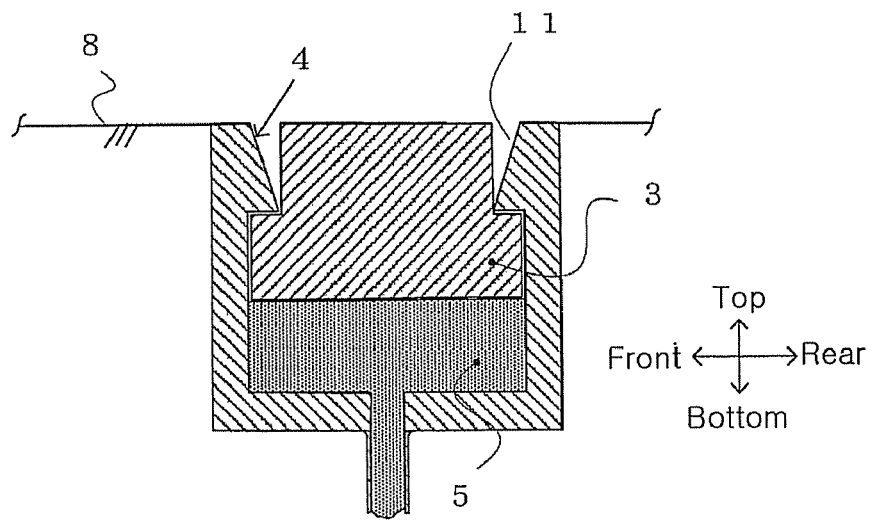
FIG. 3 is a cross-sectional view of a concave portion taken along line A-A of FIG. 2.

According to further preferred embodiments of the present invention, and as shown in FIG>3 for example, FIG. 3 is a cross-sectional view of the concave portion taken along line A-A of FIG. 2. In order for the top of the pressure plate 3 not to project from the ground surface 8, the pressure plate 3 is suitably engaged with the bottom of an inclined surface 11 of the concave portion 4. Preferably, the oil 5 is located at the bottom of the pressure plate 3.

Figure 4:
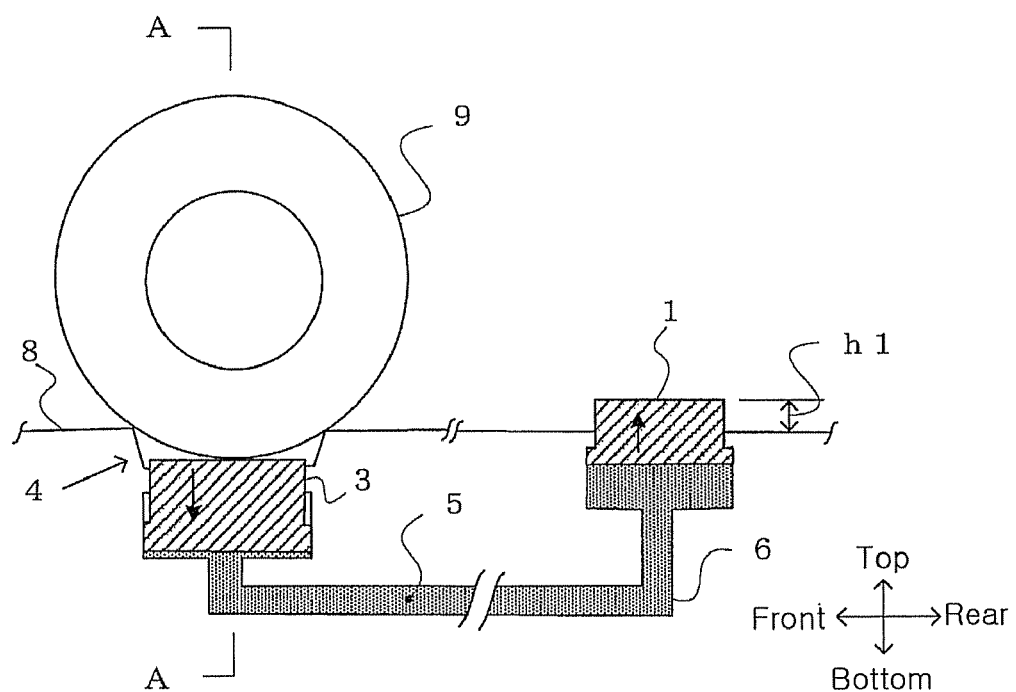
FIG. 4 is a cross-sectional view of the non-contact charging system with an elevating-type primary coil of FIG. 1, in which a vehicle load is applied to a pressure plate.

In another further exemplary embodiment, FIG. 4 is a cross-sectional view of the non-contact charging system with an elevating-type primary coil in FIG. 1, in which a vehicle load is applied to the pressure plate. Preferably, the pressure plate 3 is suitably pushed down by the vehicle load. Accordingly, the hydraulic cylinder 6 operates to suitably elevate the primary coil 1 from the ground surface 8. Reference numeral h1 of FIG. 4 represents the elevation height of the primary coil 1. In general, the ground height of a small vehicle is lower than that of a large vehicle. Accordingly, in certain preferred embodiments, for this reason, it is preferred to change the elevation height of the primary coil 1 with respect to the size of the vehicle, for example, such as the large vehicle, mid-size vehicle, and small vehicle.

Figure 5:
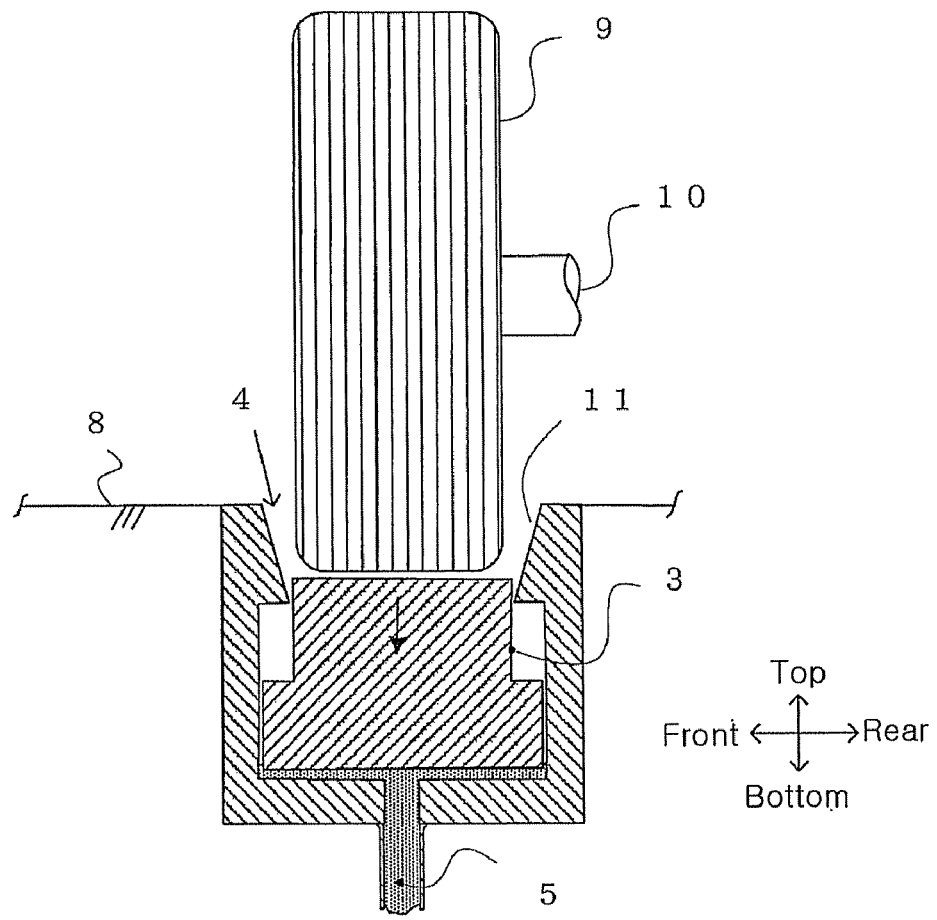
FIG. 5 is a cross-sectional view of a concave portion taken along line A-A of FIG. 4.

FIG. 5 is a cross-sectional view of the concave portion taken along line A-A of FIG. 4. According to further exemplary embodiments of the present invention, the pressure plate 3 is suitably pushed down by the tire 9 to be separated from the bottom of the inclined surface 11 and move down to the bottom of the concave portion 4. Accordingly, at this time, the hydraulic pressure of the oil 5 is suitably generated in the pressure plate 3.

Figure 6:
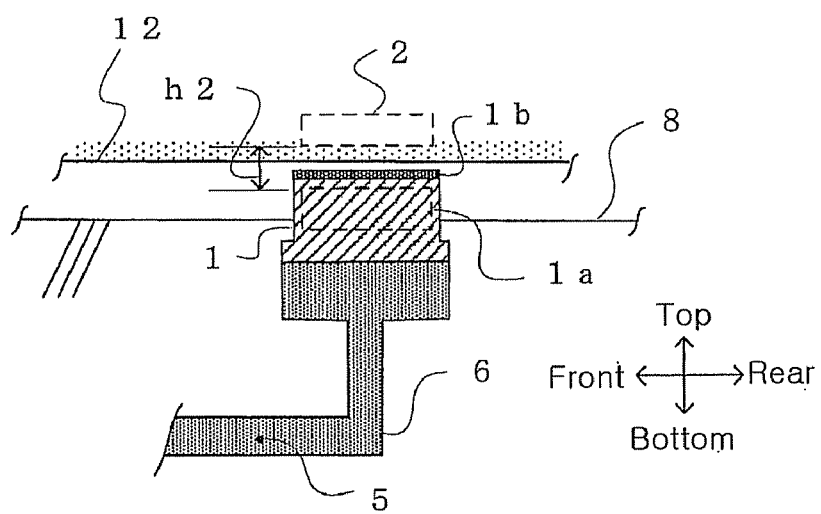
FIG. 6 is a detailed cross-sectional view of the periphery of the primary coil of FIG. 1.

FIG. 6 is a detailed cross-sectional view of the periphery of the primary coil of FIG. 1. Preferably, the primary coil 1 includes a coil unit 1a provided therein and a buffer 1b made of rubber provided on the top thereof. Even when the primary coil 1 is in contact with a vehicle body, the primary coil 1 is not damaged due to the buffer 1b. Further, an air gap between the coil unit 1a of the primary coil 1 and the secondary coil 2 is designated by reference numeral h2.

Figure 7:
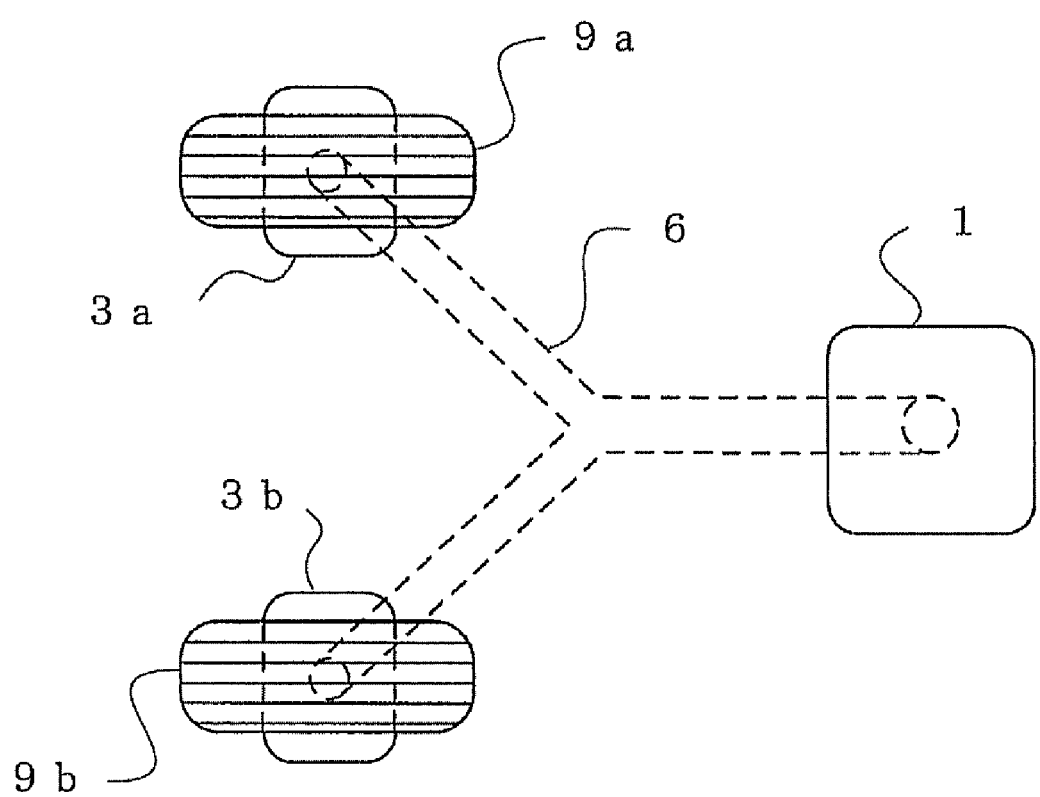
FIG. 7 is a plan view of the non-contact charging system with an elevating-type primary coil of FIG. 1.

According to further exemplary embodiments of the present invention and as shown in FIG. 7, for example, FIG. 7 is a plan view of the non-contact charging system with an elevating-type primary coil of FIG. 1. As shown in FIG. 7, a right tire 9a is located on a right tire pressure plate 3a, while a left tire 9b is put on a left tire pressure plate 3b. Preferably, the width of the pressure plate 3 is about 5 to 6 cm greater than that of the tire 9 from side to side. According to certain preferred embodiments, the concave portion 4 has the same shape as the pressure plate 3. Preferably, the right tire pressure plate 3a, the left tire pressure plate 3b, and the primary coil 1 are suitably connected to a Y-shaped hydraulic cylinder 6. That is, the hydraulic paths of the right tire pressure plate 3a and the left tire pressure plate 3b are suitably joined together and connected to the primary coil 1. In certain preferred embodiments, the hydraulic cylinder 6 may have a T-shape, instead of the Y-shape. Accordingly, in certain exemplary embodiments, although the pressure plate 3 is pushed down by the front tire in FIG. 7, the pressure plate 3 may be pushed down by a rear tire.

Figure 8:
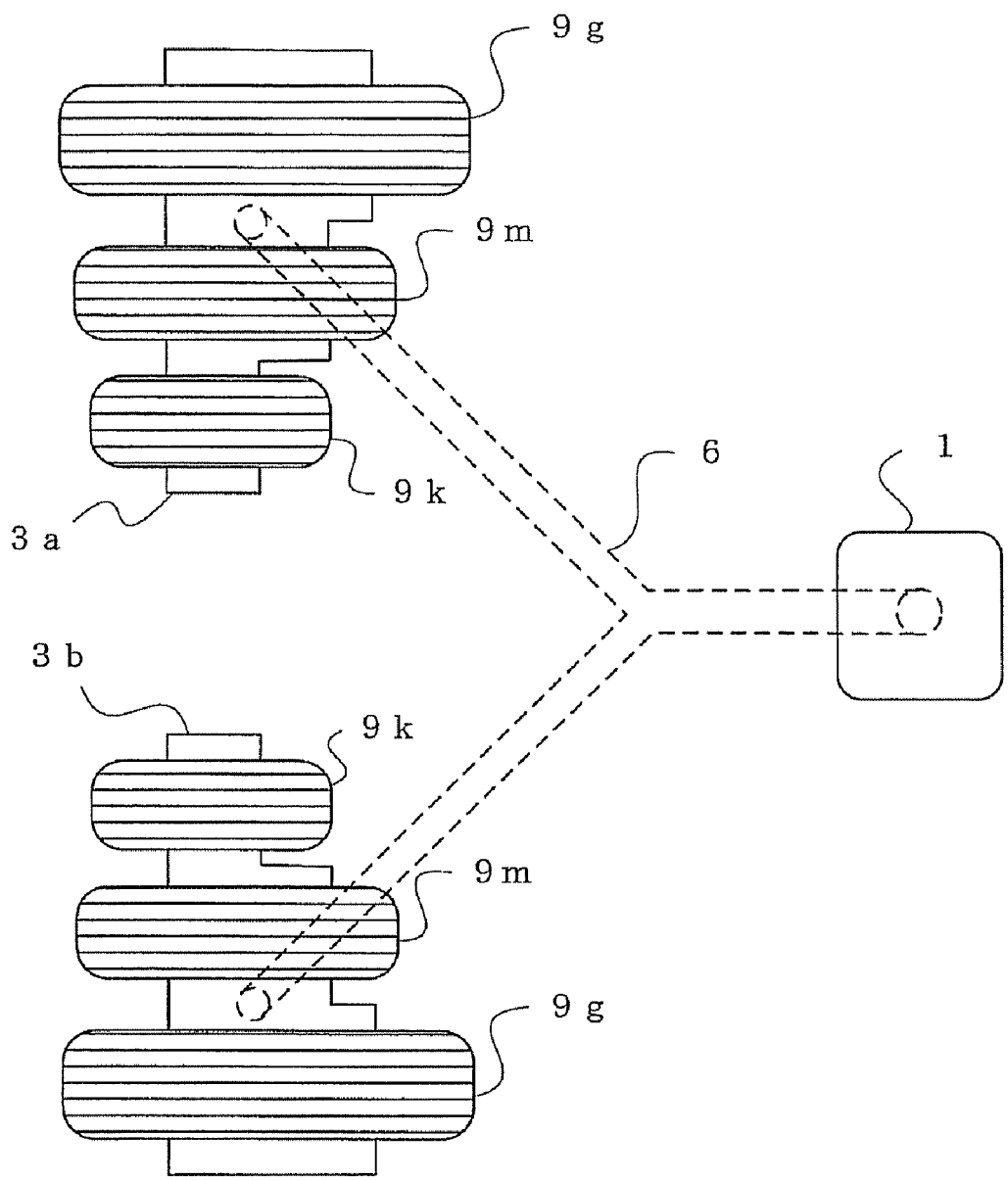
FIG. 8 is a plan view of the non-contact charging system with an elevating-type primary coil in FIG. 1, in which a pressure plate capable of being used in any of a large vehicle, a mid-size vehicle, and a small vehicle is installed.

According to other further embodiments and as shown in FIG. 8, for example, FIG. 8 is a plan view of the non-contact charging system with an elevating-type primary coil in FIG. 1, in which a pressure plate capable of being used in any of the large vehicle, the mid-size vehicle, and the small vehicle is installed. According to the configuration of FIG. 8, with the use of a single pressure plate, it is possible to cope with the difference in external diameter and the difference in length between the tires of the large vehicle, the mid-size vehicle, and the small vehicle. According to certain preferred embodiments, a small vehicle tire 9k, a mid-size vehicle tire 9m, and a large vehicle tire 9g are suitably arranged adjacent to each other in a line. Preferably, the right side pressure plate 3a is a single plate, and the small vehicle tire 9k, the mid-size vehicle tire 9m, or the large vehicle tire 9g is put thereon. According to other further preferred embodiments, the left tire pressure plate 3b is a single plate, and the small vehicle tire 9k, the mid-size vehicle tire 9m, or the large vehicle tire 9g is put thereon. As shown in FIG. 8, for example, the width of the pressure plate 3 is suitably increased in the order of the small vehicle<the mid-size vehicle<the large vehicle. Preferably, the concave portion 4 has the same shape as the pressure plate 3. Further, the secondary coil 2 of the vehicle is suitably installed at a predetermined position of the vehicle body, regardless of the size of the vehicle.

Figure 9:
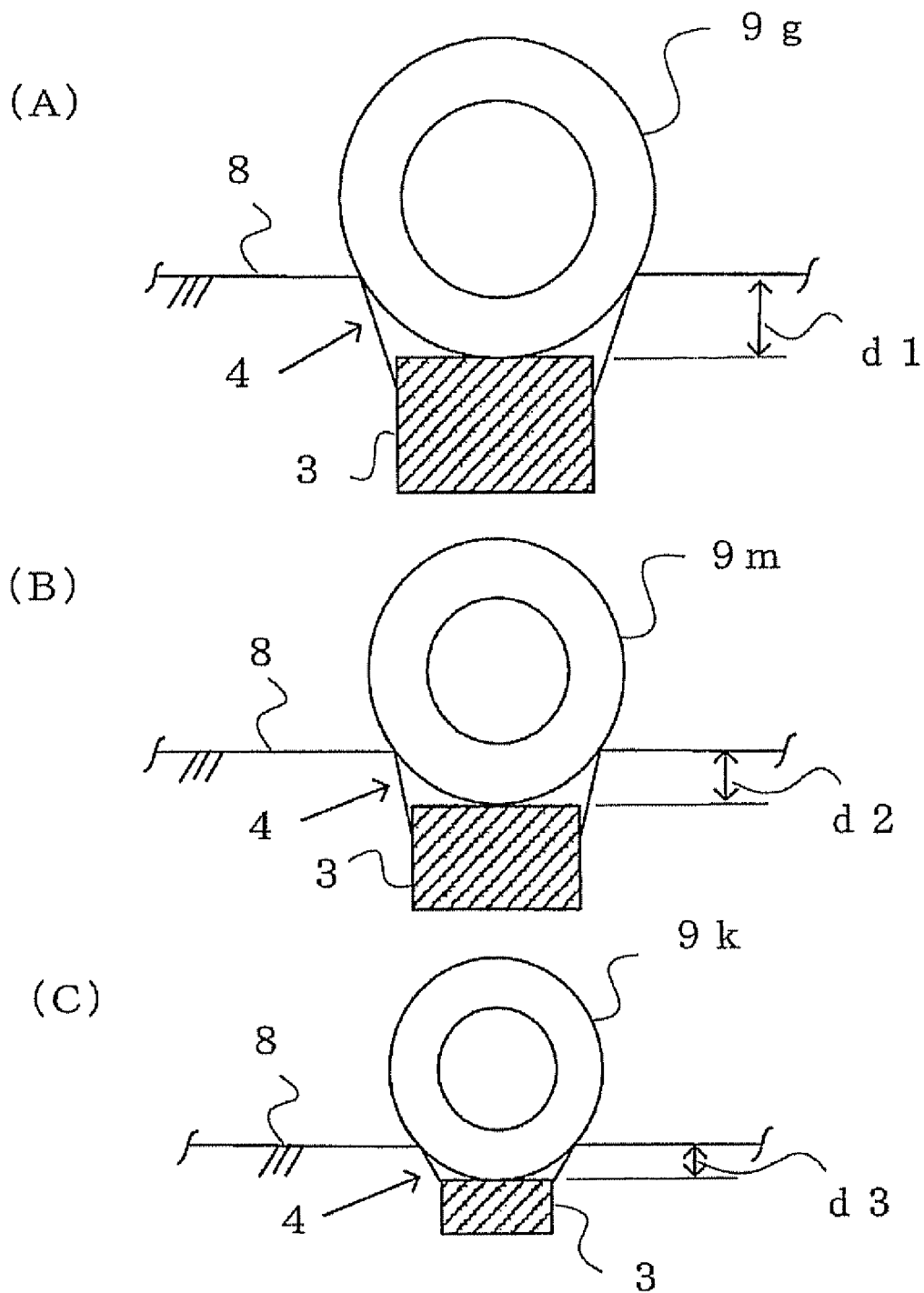
FIG. 9 is a cross-sectional view showing the relationship between the pressure plate, the concave portion and the tire of FIG. 8, in which (A), (B), and (C) indicate the large vehicle, the mid-size vehicle, and the small vehicle, respectively.

According to other further embodiments and as shown in FIG. 9, for example, FIG. 9 is a cross-sectional view showing the relationship between the pressure plate, the concave portion and the tire of FIG. 8, in which (A), (B), and (C) indicate the large vehicle, the mid-size vehicle, and the small vehicle, respectively. As shown in (A) to (C) of FIG. 9, the depth of the concave portion 4 of the large vehicle is designated by reference numeral d1, that of the mid-size vehicle is designated by reference numeral d2, and that of the small vehicle is designated by reference numeral d3. According to preferred embodiments of the present invention, the depth of the concave portion 4 is suitably increased in the order of the small vehicle<the mid-size vehicle<the large vehicle. Accordingly, the tire 9 is located deeper in the concave portion 4 as the vehicle size is suitably increased, and thus it is possible to elevate the primary coil 1 to a higher position.

Figure 10:
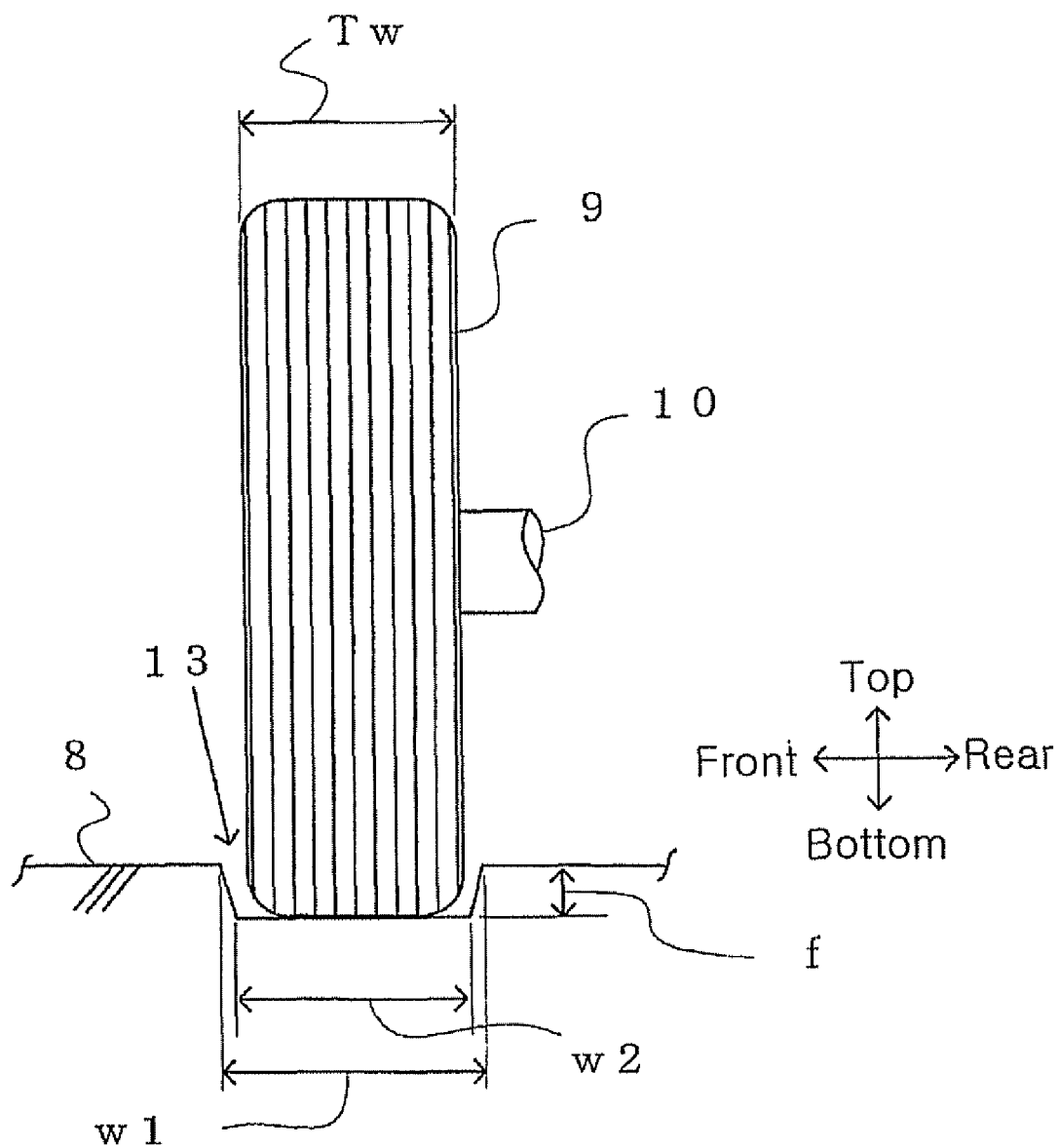
FIG. 10 is a cross-sectional view of a tire guide groove in a short direction installed in the non-contact charging system with an elevating-type primary coil.

According to other further embodiments and as shown in FIG. 0, for example, FIG. 10 is a cross-sectional view of a tire guide groove 13 in a short direction suitably installed in the non-contact charging system 100 with an elevating-type primary coil. Preferably, the tire guide groove 13 is suitably installed on the rear of the concave portion 4 and, in particular, just at the rear of the primary coil in the longitudinal direction thereof. According to certain preferred embodiments, when the vehicle is to be positioned, if the vehicle is driven such that the tires 9 enter the tire guide groove 13, it is easy to suitably guide the tires 9 to the concave portion 4 without deviation. Preferred examples of the width of the tire 9, and the top width w1, the bottom width k2, and the depth f of the tire guide groove 13 are shown in the following table 1:

TABLE 1

| | Tire width (Tw) | Top width of tire guide groove (w1) | Bottom width of tire guide groove (w2) | Length of tire guide groove (f) |
|---|---|---|---|---|
| Mid-size vehicle (Passenger vehicle) | 175 cm | 225 cm | 195 cm | 35 cm |
| Large vehicle (Bus) | 275 cm | 355 cm | 315 cm | 50 cm |

Notes:
The left and right sides of the concave portion are suitably inclined to satisfy the relationship of w1 > w2.

As described herein, according to the non-contact charging system with the elevating-type primary coil of the present invention, in which the hydraulic cylinder, which elevates the primary coil when the pressure plate is pushed down, is installed, a high capacity motor is not suitably required, and thereby it is possible to save energy. Accordingly, since the pressure plate is pushed down by the tires which enter the concave portion, it is convenient to align the position of the primary coil and the secondary coil.

According to preferred embodiments of the present invention as described herein, since the concave portion and the pressure plate are suitably installed in two places, respectively, corresponding to the left and right tires of the vehicle, and the hydraulic cylinder includes hydraulic paths from the pressure plates in two places, which are suitably joined together and connected to the primary coil, it is possible to provide high driving force. Moreover, since the left and right tires are located in two places, the vehicle is not tilted during stop.

According to further preferred embodiments of the present invention as described herein, since the depth of the concave portion, in which the tire is suitably located, differs depending on the size of the vehicle, it is possible to suitably adjust the height of the primary coil according to the size of the vehicle such as the large vehicle, the mid-size vehicle, and the small vehicle. For example, the concave portion is suitably elevated to a higher level in the case of the large vehicle.

Moreover, according to further preferred embodiments as described herein, since the concave portions for the large vehicle, the mid-size vehicle, and the small vehicle are suitably arranged adjacent to each other in a line and the pressure plate passes through the concave portions, it is possible to share the hydraulic cylinder and the primary coil, which does not require a large ground area.

Furthermore, since the tire guide groove is installed on the rear of the concave portion, if the vehicle is driven such that the tires enter the tire guide groove, it is easy to guide the tire to the concave portion.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A non-contact charging system with an elevating-type primary coil, the system comprising:
   a primary coil elevated from the ground surface to face a secondary coil of a vehicle;
   a concave portion in which a vehicle tire is put;
   a pressure plate installed on the concave portion and pushed to a predetermined depth by a vehicle load from the tire; and
   a hydraulic cylinder elevating the primary coil when the pressure plate is pushed down.

2. The system of claim 1, wherein the concave portion and the pressure plate are installed in two places, respectively, corresponding to the left and right tires of the vehicle, and the hydraulic cylinder comprises hydraulic paths from the pressure plates in two places, which are joined together and connected to the primary coil.

3. The system of claim 1, wherein the depth of the concave portion, in which the tire is located, differs depending on the size of the vehicle.

4. The system of claim 3, wherein the concave portions for a large vehicle, a mid-size vehicle, and a small vehicle are arranged adjacent to each other in a line and the pressure plate passes through the concave portions.

5. The system of claim 1, further comprising a tire guide groove installed on the rear of the concave portion.

6. A non-contact charging system with an elevating-type primary coil, the system comprising:
   a primary coil elevated from the ground surface to face a secondary coil of a vehicle;
   a concave portion in which a vehicle tire is put;
   a pressure plate; and
   a hydraulic cylinder.

7. The non-contact charging system of claim 6, wherein the pressure plate is installed on the concave portion and pushed to a predetermined depth by a vehicle load from the tire.

8. The non-contact charging system of claim 6, wherein the hydraulic cylinder elevates the primary coil when the pressure plate is pushed down.

* * * * *

UNITED STATES PATENT AND TRADEMARK OFFICE
CERTIFICATE OF CORRECTION

PATENT NO. : 8,264,197 B2
APPLICATION NO. : 12/824841
DATED : September 11, 2012
INVENTOR(S) : Yoshiro Shimoyama It is certified that error appears in the above-identified patent and that said Letters Patent is hereby corrected as shown below:

On the title page of the patent, at Column 1, in the section designated "ASSIGNEE"
Item (73) please add -- Kia Motors Corporation, Seoul, KR --

Signed and Sealed this
Third Day of September, 2013

Teresa Stanek Rea
*Acting Director of the United States Patent and Trademark Office*